(12) United States Patent
Honma et al.

(10) Patent No.: US 7,344,667 B2
(45) Date of Patent: Mar. 18, 2008

(54) PREPREG, PRODUCTION PROCESS THEREOF, AND MOLDED ARTICLE

(75) Inventors: Masato Honma, Matsuyama (JP);
Yasunori Nagashima, Kusatsu (JP);
Soichi Ishibashi, Yokohama (JP); Yuji Kojima, Ehime (JP); Atsuki Tsuchiya, Ehime (JP)

(73) Assignee: TORAY Industries, Inc., Tokyo (JP)

( * ) Notice: Subject to any disclaimer, the term of this patent is extended or adjusted under 35 U.S.C. 154(b) by 0 days.

(21) Appl. No.: 10/512,338

(22) PCT Filed: Apr. 21, 2003

(86) PCT No.: PCT/JP03/05036

§ 371 (c)(1),
(2), (4) Date: Oct. 21, 2004

(87) PCT Pub. No.: WO03/091015

PCT Pub. Date: Nov. 6, 2003

(65) Prior Publication Data
US 2005/0150593 A1 Jul. 14, 2005

(30) Foreign Application Priority Data
Apr. 23, 2002 (JP) .............................. 2002-120282

(51) Int. Cl.
*B29C 67/00* (2006.01)
*B29C 45/14* (2006.01)
*D04H 3/16* (2006.01)
(52) U.S. Cl. ...................... 264/136; 264/257; 264/510; 156/167; 156/180
(58) Field of Classification Search ................ 156/172, 156/162, 164, 184, 62.4, 62.6, 167, 169, 156/180, 181, 168; 428/170, 171, 218, 297; 264/136, 257, 510
See application file for complete search history.

(56) References Cited

U.S. PATENT DOCUMENTS

| 4,871,491 A | | 10/1989 | McMahon et al. ......... 264/29.2 |
| 4,880,584 A | * | 11/1989 | Jones et al. ................ 264/135 |
| 4,883,552 A | * | 11/1989 | O'Connor et al. .......... 156/180 |
| 4,910,064 A | * | 3/1990 | Sabee .......................... 428/113 |
| 5,108,678 A | * | 4/1992 | Hirasaka et al. ............ 264/113 |
| 6,063,717 A | * | 5/2000 | Ishiyama et al. ........... 442/387 |
| 6,656,302 B2 | * | 12/2003 | Kishi et al. ................. 156/172 |

(Continued)

FOREIGN PATENT DOCUMENTS

EP 0 156 599 A1 10/1985

(Continued)

OTHER PUBLICATIONS

Fairchild's Dictionary of Textiles, 1996, p. 443.*

*Primary Examiner*—N. Edwards
(74) *Attorney, Agent, or Firm*—Kubovcik & Kubovcik (57) ABSTRACT

This invention provides a prepreg excellent in productivity, having the drapability to allow easy shaping according to a mold, excellent in resin impregnation, and excellent in handling convenience. This invention also provides a molded article with excellent mechanical properties obtained by molding the prepreg. The prepreg of this invention is a prepreg including reinforcing fibers and a thermoplastic resin, characterized in that an air-permeable layer (B) composed of the thermoplastic resin is laminated on a continuous reinforcing fiber bundle (A), and that the reinforcing fiber bundle (A) and the layer (B) composed of the thermoplastic resin are bonded at their interface.

2 Claims, 4 Drawing Sheets

U.S. PATENT DOCUMENTS 6,998,434 B2 * 2/2006 Wadahara et al. .......... 524/495

FOREIGN PATENT DOCUMENTS

| EP | 0 409 993 | A1 | 1/1991 |
| EP | 1 125 728 | A1 | 8/2001 |
| EP | 1 184 496 | A2 | 3/2002 |
| JP | 60-209033 | A | 10/1985 |
| JP | 3-47713 | A | 2/1991 |
| WO | WO00/56539 | A1 | 9/2000 |

* cited by examiner

PREPREG, PRODUCTION PROCESS THEREOF, AND MOLDED ARTICLE

TECHNICAL FIELD

The present invention relates to a prepreg comprising reinforcing fibers and a thermoplastic resin. In more detail, it relates to a prepreg excellent in productivity, having the drapability to allow easy shaping according to a mold, excellent in resin impregnation, and excellent in handling convenience.

BACKGROUND ART

A fiber-reinforced thermoplastic resin composite in which a continuous reinforcing fiber bundle is impregnated with a thermostatic resin is generally called a prepreg, and is widely used as a base to be molded into the members of motor vehicles and airplanes, general industrial materials, and, in addition, sporting and leisure applications such as golf clubs.

Since a molded article obtained by molding said prepreg is required to have surface appearance quality, mechanical properties, etc., it is necessary to sufficiently impregnate the reinforcing fiber bundle with a resin, for decreasing voids as far as possible. For this reason, a prepreg in which the reinforcing fiber bundle is virtually perfectly impregnated with the thermoplastic resin, a so-called perfect impregnation type prepreg is preferably used.

In this case, impregnation refers to a state where the thermoplastic resin permeates among single fibers of the reinforcing fiber bundle substantially without any clearance.

However, though this perfect impregnation type prepreg allows the voids in the molded article to be decreased, it is poor in the handling capability (hereinafter called drapability) experienced when it is molded for being shaped according to a complicatedly shaped mold since it is rigid, and it is greatly limited in the degree of shaping freedom of the final product. Furthermore, in general, in order to make the reinforcing fiber bundle impregnated with the thermoplastic resin sufficiently inside, a step of, for example, forcibly "stroking" the composite comprising the molten resin and the reinforcing fiber bundle is necessary, and the reinforcing fiber bundle becomes, for example, fluffy, to cause such problems as lowering the appearance quality and mechanical properties of the obtained molded article. Moreover, such impregnation may require a long time as the case may be, and the productivity of the molded article is another problem.

As described above, in view of the impregnability and drapability to be maintained at high levels, the perfect impregnation type prepreg has a technical limit.

So, in recent years, prepregs of a comingled form and a discontinuous comingled form have been developed.

In this case, a comingled form refers to a composite form in which a continuous thermoplastic resin is made to exist as fibers inside a continuous reinforcing fiber bundle. Furthermore, a discontinuous comingled form refers to a composite form in which a discontinuous thermoplastic resin is made to exist as fibers in a continuous reinforcing fiber bundle.

For example, JP60-209033A discloses a method for producing a prepreg of a comingled form comprising a continuous reinforcing fiber bundle and a continuous thermoplastic resin fiber bundle. This form is excellent in drapability, since a prepreg per se is already impregnated with a thermoplastic resin, and furthermore, since the reinforcing fiber bundle and the thermoplastic resin are disposed nearby, the impregnability is also good. However, when the prepreg is carried or shaped according to a mold, it can happen that the reinforcing fiber bundle and the thermoplastic resin fibers are separated, and a preliminary step of spinning the thermoplastic resin into a multifilament is needed. So, after all, the comingled form cannot be industrially used in view of productivity and handling convenience.

Moreover, JP03-47713A discloses a process for producing a prepreg of a discontinuous comingled form, comprising the steps of placing a sheet comprising short discontinuous thermoplastic resin fibers cut to a length of 20 mm to 200 mm oriented at random on a continuous reinforcing fiber bundle, and intermingling forcibly using such an intermingling method as a water jet. This form is also good in the impregnability during molding. Furthermore, since the form is kept because of perfect interminglement, the problem that the reinforcing fiber bundle the thermoplastic resin fibers are separated does not arise. However, since the thermoplastic resin fibers are disposed as short fibers, the prepreg becomes bulky and has such a problem of drapability that it cannot be shaped depending on the shape of the mold. Furthermore, since such a forced intermingling method as a water jet is used, it can happen that the reinforcing fibers are broken or curved, and there arises such a problem that the molded article declines in surface appearance quality, mechanical properties, etc. Moreover, a step of spinning a thermoplastic resin into a multifilament and a step of cutting it into short fibers using a cutter or the like are needed additionally. As a result, like a comingled form, this form cannot be industrially used either in view of productivity.

As described above, no prepreg satisfying impregnability, drapability, handling convenience and productivity at high levels has been found yet.

DISCLOSURE OF THE INVENTION

This invention provides a prepreg excellent in productivity, having the drapability to allow easy shaping according to a mold, excellent in resin impregnation, and excellent in handling convenience.

The inventors found that these problems can be solved all at once, if a specific structure comprising a reinforcing fiber bundle and a thermoplastic resin is employed.

That is, this invention is a prepreg comprising reinforcing fibers and a thermoplastic resin, wherein an air-permeable layer (B) comprising the thermoplastic resin is laminated on a continuous reinforcing fiber bundle (A), and that said reinforcing fiber bundle (A) and said layer (B) comprising the thermoplastic resin are bonded at their interface.

Furthermore, this invention is a process for producing a prepreg, comprising a step of air-blowing a heated and molten thermoplastic resin, to form a layer (B) comprising the thermoplastic resin, and a step of laminating a continuous reinforcing fiber bundle (A) and the layer (B) comprising the thermoplastic resin.

Still furthermore, this invention is an apparatus for producing a prepreg, comprising a carrying device for continuously carrying a reinforcing fiber bundle, a spreading device for spreading the reinforcing fiber bundle, and a laminating device for melting and blowing a thermoplastic resin using air blow.

Moreover, this invention also includes a molded article obtained by molding the prepreg of this invention.

THE BEST MODES FOR CARRYING OUT THE INVENTION

This invention is described below particularly.

The prepreg of this invention comprises reinforcing fibers and a thermoplastic resin. In this case, the reinforcing fiber bundle (A) used in this invention means a bundle of reinforcing fibers aligned in one direction. In this case, the reinforcing fibers are used mainly for the purpose of reinforcing the thermoplastic resin. As examples of the reinforcing fibers, enumerated are glass fibers, carbon fibers, metal fibers, aromatic polyamide fibers, polyaramide fibers, alumina fibers, silicon carbide fibers, boron fibers, etc. One kind of them can be used, or two or more kinds of them can also be used together. Furthermore, the surfaces of the reinforcing fibers can also be covered with a metal or the like, or can have a metal or the like vapor-deposited. Still furthermore, the reinforcing fibers can also be treated on the surfaces, or treated for coupling beforehand. Especially carbon fibers with a small specific gravity, high strength and high elastic modulus can be preferably used, since they can enhance the reinforcing efficiency of the molded article.

Moreover, the reinforcing fiber bundle can be given a sizing agent for the purpose of improving its handling convenience. The sizing agent is not especially limited in its kind, applying method, deposited amount or deposition form, etc., if they are in such an extent that the effects of this invention are not impaired. Furthermore, the reinforcing fiber bundle can also be given any desired additive suitable for the purpose.

As examples of the thermoplastic resin used in this invention, enumerated are polyester resins such as polyethylene terephthalate, polybutylene terephthalate, polycyclohexanedimethyl terephthalate, and liquid crystal polyesters, polyolefins such as polyethylene polypropylene, and polybutylene, polyoxymethylene resin, polyamide resins, polycarbonate resins, polyarylate resins, polymethyl methacrylate resin, polyvinyl chloride, ABS resin, AES resin, AAS resin, styrene-based resins such as polystyrene (PS) resin, and HIPS resin, polyphenylene sulfide (PPS) resin, modified polyphenylene ether (PPE) resins, polyimide resins, polyamideimide resins, polyether imide resins, polysulfone resins, polyether sulfone resins, polyether ketone resins, polyether ether ketone resins, phenol resins, phenoxy resins, their copolymers, modification products, etc. One of them can be used, or two or more of them can also be used together. Above all, in view of the mechanical properties of the obtained molded article and moldability, it is preferred to use at least one thermoplastic resin selected from a group consisting of polyamide resins, polyester resins, polyphenylene sulfide (PPS) resin, polyether imide resins, polycarbonate resins, and styrene-based resins.

Furthermore, an elastomer, rubber ingredient, flame retarder, inorganic filler, electric conductivity enhancing ingredient such as carbon black, crystal nucleating agent, ultraviolet light absorber, damping material, antimicrobial agent, insecticide, deodorant, coloring matter, pigment, dye, thermal stabilizer, releasing agent, antistatic agent, plasticizer, lubricant, foaming agent, defoaming agent, coupling agent, etc. can also be added to said resin, to such an extent that the effects of this invention are not impaired.

The prepreg of this invention is characterized in that an air-permeable layer (B) comprising a thermoplastic resin is laminated on a continuous reinforcing fiber bundle (A), and that said reinforcing fiber bundle (A) and said layer (B) comprising a thermoplastic resin are bonded at their interface.

In this case, the interface between the reinforcing fiber bundle (A) and the layer (B) comprising a thermoplastic resin means the face at which single yarns of the reinforcing fibers and the thermoplastic resin contact. Furthermore, bonding refers to a state where single yarns of the reinforcing fibers and the thermoplastic resin are bonded by chemical, physical or electric bonding force or the like, at such a strength that they are not easily delaminated during carrying or in the molding step. For example, a rule of thumb in this invention is such that when the prepreg is lifted by holding either the reinforcing fiber bundle (A) or the layer (B) comprising a thermoplastic resin, both are not delaminated at their interface. Particularly, this state refers, for example, to a state in which the reinforcing fiber bundle (A) and the layer (B) comprising a thermoplastic resin are fusion-bonded or bonded using an adhesive at their interface. In view of easy production, fusion bonding is especially preferred.

It is important that the prepreg of this invention satisfies the following conditions.

(1) Having drapability.
(2) Being excellent in resin impregnation during molding.
(3) Being excellent in handling convenience.

The above-mentioned condition (1) will be described. For example, in the case where the prepreg is laid up in a press mold for hot press molding or the like, how the prepreg can be adapted to the shape of the press mold when laid up is a point deciding the moldability. In the case where the prepreg cannot be accurately or easily adapted to the shape of the press mold, work such as heating the prepreg for gradually deforming it for adaptation to the shape of the press mold is needed to remarkably lower the productivity of the molded article.

Next, the above-mentioned condition (2) will be described. For example, in the case where the prepreg is laid up in a press mold for hot press molding or the like, the air remaining in the reinforcing fiber bundle greatly resists the impregnation pressure of the thermoplastic resin in the closed press mold, to prevent that the thermoplastic resin is impregnated into the reinforcing fiber bundle. Furthermore, there is another problem that the air remaining in the reinforcing fiber bundle remains as it is as voids in the molded article. How efficiently the air remaining in the reinforcing fiber bundle can be discharged in the step of press molding is a point deciding the surface appearance and physical properties of the molded article. Therefore, if the layer comprising a thermoplastic resin is air-permeable, the air can be discharged quickly from inside the reinforcing fiber bundle to outside the prepreg during press molding. Such a prepreg is excellent in impregnability, and voids are unlikely to be formed in the obtained molded article.

In this case, the air permeability can be measured, for example, by the Gurley tester method based on JIS P 8117 or by the Frazier method based on ASTM D 737. As a rule of thumb of air permeability, for example, if the air permeability index measured by the Gurley tester method based on JIS P 8117 is 5000 seconds or less, air can be sufficiently discharged during molding. If the value of this index is smaller, it means that the air permeability is more excellent. Furthermore, as evaluation in a more excellent air permeability range, it is preferred that the air quantity ($cm^3/cm^2 \cdot s$) measured by the Frazier method based on ASTM D 737 is used as a rule of thumb. A preferred air quantity is 10 or more. More preferred is 50 or more, and especially preferred is 100 or more. If the value of this index is larger, it means that the air permeability is more excellent. It is preferred that the upper limit in the air quantity is 3000 or less. If the air quantity is in this range, air can be discharged well during molding, and in addition, drapability is also good.

Furthermore, the above-mentioned condition (3) will be described. In the case where the layer (B) comprising a thermoplastic resin is easily delaminated or drop off from the reinforcing fiber bundle (A), for example, due to the vibration during the carrying of the prepreg or in the molding step, the resin may be nonuniform in the obtained molded article, to impair the mechanical properties and surface appearance. In the case where the delamination or drop-off is more remarkable, molding per se becomes difficult.

The layer comprising a thermoplastic resin in this invention is only required to be air-permeable, and particularly, for example, fibers, a porous film or powder, etc. can be used. However, in view of effectively achieving the above-mentioned conditions (1) through (3), a fiber aggregate is preferred.

In this invention, a fiber aggregate refers to a state in which when the surface of the layer (B) comprising a thermoplastic resin is observed using a scanning electron microscope (SEM) or optical microscope, etc., a fibrous form or a form resulting from fibers can be observed and is partially fusion-bonded. In this case, the partial fusion boding means that the fibers constituting the fiber aggregate are at least partially melt-integrated.

The fiber aggregate per se is soft and excellent in drapability, and it is partially bonded at the interface with the reinforcing fiber bundle. Therefore, the prepreg as a whole is also excellent in drapability. In this case, the partial bonding means that single fibers constituting the reinforcing fiber bundle and the fibers constituting the fiber aggregate are bonded only at the portions where they contact, and are not bonded at the other portions of the interface. If the reinforcing fiber bundle and the layer comprising a thermoplastic resin are bonded along the entire interface, the prepreg declines in handling convenience.

The form of the fiber aggregate is not especially limited, but in view of easy production and an excellent degree of freedom in shape design, a nonwoven fabric or a woven fabric is preferred, and especially a nonwoven fabric is preferred.

Furthermore, it is preferred that the fibers constituting the fiber aggregate are oriented substantially at random, since the prepreg is higher in drapability.

The average fiber diameter of the fibers constituting the fiber aggregate is not especially limited, and fibers of 200 µm or less can be preferably used. In view of further enhancing the drapability of the prepreg of this invention, it is more preferred that the average fiber diameter of the fibers is 0.1 to 10 µm, and especially preferred is 1 to 8 µm. In this case, the average fiber diameter refers to a number average value obtained by observing the fiber aggregate using an optical microscope or the like and measuring the diameters of more than 500 samples.

The method for producing the fiber aggregate is not limited, but the melt blow method described later is preferred, since a nonwoven fabric having fibers oriented substantially at random, partially fusion-bonded and having a small average fiber diameter can be obtained.

Moreover, in the prepreg, it is preferred that the reinforcing fiber bundle (A) contains part of the layer (B) comprising a thermoplastic resin. It is preferred that the reinforcing fiber bundle (A) contains part of the layer (B) comprising a thermoplastic resin beforehand, since the resin impregnation during molding is easier, but on the other hand, in view of the drapability of the prepreg, it is preferred that the content of the layer (B) comprising a thermoplastic resin is smaller. Therefore, the content of the layer (B) comprising a thermoplastic resin in the reinforcing fiber bundle (A) is preferably 1% to 50%, more preferably 3% to 30%. In this case, the content of the layer (B) comprising a thermoplastic resin in the reinforcing fiber bundle (A) in the prepreg can be measured under observation using an SEM or optical microscope, etc. An example of the method comprises the steps of observing a section of the prepreg in the reinforcing fiber bundle (A) orientation direction, drawing an outline along the outermost contour of the reinforcing fiber bundle, to define the reinforcing fiber bundle region. And the content is obtained from the rate of dividing the area of the thermoplastic resin existing in the region by the area of the reinforcing fiber bundle region.

Since the prepreg of this invention is excellent in drapability, plural sheets of it can also be laminated and molded in a mold. In this case, it is advantageous in view of the degree of freedom in the design of lamination structure that the thickness of the prepreg is thinner, since the molded article can be thinner or since more sheets of the prepreg can be laminated. On the other hand, for stable production of the prepreg, it is desirable that the prepreg has a certain thickness.

Therefore, it is preferred that the average thickness of the reinforcing fiber bundle (A) used in the prepreg of this invention is in a range from 10 to 2000 µm, and a more preferred range is from 100 to 1000 µm.

Furthermore, it is preferred that the average thickness of the layer (B) comprising a thermoplastic resin laminated in the prepreg of this invention is in a range from 10 to 2000 µm, and a more preferred range is from 30 to 300 µm.

Moreover, in view of efficiently discharging air during molding, it is preferred that the average layer thickness ratio ($t=t1/t2$) is in a range from 0.5 to 50, where t1 (µm) is the average thickness of the reinforcing fiber bundle (A), and t2 (µm) is the average thickness of the layer (B) comprising a thermoplastic resin. A more preferred range is from 1 to 45, and an especially preferred range is from 3 to 40.

In this case, the average thickness can be measured by observing a section of the prepreg using an SEM or optical microscope, etc., as in the measurement of the thermoplastic resin content. The value obtained by averaging the thicknesses of at least 10 points established at measuring point intervals of 0.1 mm or more should be the average thickness.

Furthermore, if the preferred ratio of the reinforcing fiber bundle (A) and the layer (B) comprising a thermoplastic resin in the prepreg of this invention is expressed by a volume ratio, it is preferred that the reinforcing fiber bundle (A) accounts for 5 to 80 vol % in view of the mechanical properties and surface appearance of the obtained molded article. More preferred is 10 to 80 vol %, and especially preferred is 15 to 80 vol %. Therefore, it is preferred that the layer (B) comprising a thermoplastic resin accounts for 20 to 95 vol %. More preferred is 20 to 90 vol %, and especially preferred is 20 to 85 vol %. In this case, the volume percent can be easily measured from the weights and specific gravities of the respective ingredients.

Next, the process for producing the prepreg of this invention is described below.

The prepreg of this invention can be produced by a production process comprising, at least, the first step of air-blowing a heated and molten thermoplastic resin, to form a layer (B) comprising the thermoplastic resin, and the second step of laminating a continuous reinforcing fiber bundle (A) and the layer (B) comprising the thermoplastic resin.

In the first step, at first, if a thermoplastic resin is heated to be molten, and subsequently air-blown, it can be processed into a form satisfying the above-mentioned conditions (1) through (3). In this case, as the method for heating and melting the thermoplastic resin, a general method using a single-screw extruder, a double-screw extruder or the like can be used.

Furthermore, the method for air-blowing the molten thermoplastic resin can be, for example, a method in which while the thermoplastic resin, as molten, is discharged from a die, pressure air is emitted from an air jet port provided near the discharge port. The pressure of the air used in this case is not especially limited, but preferred is 0.5 to 150 MPa. If the pressure is kept in the above-mentioned range, the thermoplastic resin can be processed into a preferred fibrous form, and in addition, the quality of the obtained prepreg can be assured. Furthermore, it is more preferred in view of the drapability of the prepreg, that preheated air is used, since the fiber diameter of the thermoplastic resin can be smaller.

In the second step, the layer (B) comprising the thermoplastic resin obtained in the first step is laminated on a continuous reinforcing fiber bundle (A). In this case, the layer (B) comprising a thermoplastic resin can be formed separately, and then can be laminated on the reinforcing fiber bundle (A). However, in this invention, more preferred is a method of blowing the heated and molten thermoplastic resin to the continuous reinforcing fiber bundle (A), using air blow, for laminating the continuous reinforcing fiber bundle (A) and the layer (B) comprising the thermoplastic resin. This method is preferred in view of productivity, since the first step and the second step can be performed in one process. Moreover, the thermoplastic resin blown to the reinforcing fiber bundle by air blow forms an air-permeable nonwoven fabric form having fibers fusion-bonded to each other. Furthermore, the fibers constituting the nonwoven fabric are oriented substantially at random. Still furthermore, the reinforcing fiber bundle (A) and the layer (B) comprising the thermoplastic resin are fusion-bonded at the interface. Therefore, the prepreg satisfies the above-mentioned conditions (1) through (3).

When the continuous reinforcing fiber bundle (A) and the layer (B) comprising the thermoplastic resin are laminated, it is desirable that the reinforcing fiber bundle (A) is spread beforehand. If the reinforcing fiber bundle is spread beforehand, its thickness can be made thinner, and the thermoplastic resin impregnability during molding can be further enhanced. It is preferred that the spreading ratio is 2.0 or more, and more preferred is 2.5 or more. In this case, the spreading ratio can be calculated from spreading ratio=(b2/a2)/(b1/a1), where b1 (mm) is the width of the reinforcing fiber bundle not yet spread, a1 (μm) is the thickness of the reinforcing fiber bundle not yet spread, b2 (mm) is the width of the spread reinforcing fiber bundle, and a2 (μm) is the thickness of the spread reinforcing fiber bundle.

The method for spreading the reinforcing fiber bundle is not especially limited, and for example, the following publicly known methods can be used: a method of passing along projected and depressed rolls alternately, a method of using a drum-shaped roll, a method of applying tension variation to the vibration in the axial direction, a method of varying the tension of the reinforcing fiber bundle using two vertically reciprocating frictional bodies, a method of blowing air to the reinforcing fiber bundle (JP5-247716A), a method of air-sucking the reinforcing fiber bundle, a method of using a spring spreading element, a method of using an expander roll, etc. Furthermore, two or more of these methods can also be combined.

In this case, it is preferred in view of the productivity of the prepreg, to use air blow for spreading the continuous reinforcing fiber bundle (A) and blowing the thermoplastic resin simultaneously.

The process for producing the prepreg of this invention can also be combined with another step to such an extent that the effects of this invention are not impaired. As examples of the other step, enumerated are a reinforcing fiber bundle preheating step, cooling step, electron beam irradiation step, plasma treatment step, strong magnetic field giving step, ultrasonic wave giving step, third ingredient depositing step, etc.

The prepreg of this invention can be produced using a production apparatus comprising a device for continuously carrying a reinforcing fiber bundle, a spreading device for spreading the reinforcing fiber bundle, and a laminating device for melting and blowing the thermoplastic resin using air blow. Furthermore, for the purpose of improving the productivity of the prepreg, it is preferred that said devices are arranged in the same line, and it is more preferred to continuously arrange the spreading device and the laminating device, for use as an apparatus having both the functions of spreading the reinforcing fiber bundle and laminating the thermoplastic resin simultaneously in-line.

The prepreg of this invention obtained like this has a form in which the layer (B) comprising a thermoplastic resin is laminated on there in forcing fiber bundle. However, furthermore, a form in which layers comprising a thermoplastic resin are laminated on both the sides of a reinforcing fiber bundle like sandwich, and a core-sheath form in which a layer comprising a thermoplastic resin laminated around the entire circumference of a reinforcing fiber bundle can also be used. If the covering of the reinforcing fiber bundle is large like this, the prepreg can be relatively easily handled.

In this case, the form in which layers comprising a thermoplastic resin are laminated on both sides of a reinforcing fiber bundle can be obtained by blowing the thermoplastic resin onto both the surfaces of the continuous reinforcing fiber bundle.

Furthermore, the form in which a layer comprising a thermoplastic resin is laminated around the entire circumference of a reinforcing fiber bundle can be obtained, for example, by rounding or folding the prepreg of this invention around the axial center in the longitudinal direction.

That is, the prepreg of this invention can be secondarily processed into a desired shape for adaptation to the shape of the intended molded article or the molding method. The shape of secondary processing is not especially limited. As examples of the shape, enumerated are a long sheet shape paralleled in one direction, a shape having creases in the longitudinal direction, a shape folded in the longitudinal direction, a discontinuous shape cut at a length of about 1 to about 50 mm, a woven fabric shape having plural yarn-like prepregs woven, a knitted fabric shape, etc.

The molded article of this invention is obtained by molding and processing such a prepreg by an ordinary molding method. As examples of the molding method, enumerated are press molding, filament winding molding, stamping molding, etc. Since the obtained molded article is thermoplastic, insert molding, outsert molding, thermal fusion bonding, vibration fusion bonding, ultrasonic fusion boding, etc. can also be used.

Since the molded article obtained in this invention is reinforced by continuous reinforcing fibers, it is excellent in mechanical properties and assures also industrially useful productivity and economic efficiency, being able to be developed into various applications.

The various applications include, for example, the parts, members and housings of electric or electronic apparatuses such as various gears, various cases, sensors, LED lamps, connectors, sockets, resistors, relay cases, switches, coil bobbins, capacitors, optical pickups, oscillators, various terminal boards, transformers, plugs, printed wiring boards, tuners, speakers, microphones, headphones, small motors, magnetic head bases, power modules, semiconductors, displays, FDD carriages, chassis, HDD, MO, motor brush holders, parabola antennas, notebook personal computers, and cellular phones, the parts, members and housings of household or office products such as telephone sets, facsimiles, VTRs, copiers, television sets, irons, hair dryers, rice cookers, electronic ovens, acoustic apparatuses, cleaners, toiletry articles, laser discs, compact discs, illumination, refrigerators, air conditioners, typewriters, and word processors, the parts, members and housings of game and amusement products such as pachinko machines, slot machines, and game machines, the parts, members and housings of optical apparatuses and precision machines such as microscopes, binoculars, cameras, and timepieces, the parts, members and outside plates relating to motor vehicles such as motor parts, alternator terminals, alternator connectors, IC regulators, potentiometer bases for light deer, suspension parts, exhaust gas valves, various other valves, various pipes relating to fuel, exhaust gas or intake gas, air intake nozzle snorkels, intake manifolds, various arms, various frames, various hinges, various bearings, fuel pumps, gasoline tanks, CNG tanks, engine cooling water joints, carburetor main bodies, carburetor spacers, exhaust gas sensors, cooling water sensors, oil temperature sensors, brake pad wear sensors, throttle position sensors, crankshaft position sensors, air flow meters, brake pad wear sensors, air conditioner thermostat bases, interior heating warm air flow control valves, radiator motor brush holders, water pump impellers, turbine vanes, wiper motor related parts, distributors, starter switches, starter relays, transmission wire harnesses, window washer nozzles, air conditioner panel switch boards, fuel related electromagnetic valve coils, fuse connectors, battery trays, AT brackets, head lamp supports, pedal housings, handles, door beams, protectors, chassis, frames, arm rests, horn terminals, step motor rotors, lamp sockets, lamp reflectors, lamp housings, brake pistons, noise shields, radiator supports, spare tire covers, seat shells, solenoid bobbins, engine oil filters, igniter cases, under covers, scuff plates, pillar trims, propeller shafts, wheels, fenders, fascias, bumpers, bumper beams, bonnets, aeroparts, platforms, cowl louvers, roofs, instrument panels, spoilers, and various modules, the parts, members and skins relating to airplanes such as landing gear pots, winglets, spoilers, edges, rudders, elevators, fairings, and ribs, the parts and members relating to sports such as various rackets, golf club shafts, yachts, boards, ski articles, and fishing rods, the parts relating to artificial satellites, etc.

Among the above, since the molded article of this invention has lightweight, high rigidity and electromagnetic wave shielding capability, it can be preferably used for such applications as electric or electronic apparatuses and OA apparatuses including personal computers, displays, cellular phones, portable information terminals, etc. Above all, it can be suitably used in portions requiring rigidity such as housings.

Furthermore, since a large molded article with excellent mechanical properties can be easily produced, it can also be used for the members and outside plates or skins of motor vehicles or airplanes.

This invention is described below more particularly in reference to examples.

Thee evaluation items and evaluation methods concerning the components, prepregs and molded articles using them, of this invention, are described below.

[Evaluation Methods Concerning the Components of this Invention]

(1) Air Permeability

The air permeability of the layer (B) comprising a thermoplastic resin was evaluated in reference to the air quantity ($cm^3/cm^2 \cdot s$) measured by the Frazier method based on the ASTM D 737 standard. A larger air quantity means more excellent air permeability.

Furthermore, when the air permeability was very low, the measurement according to the above-mentioned standard cannot be made. So, it was evaluated as a rule of thumb in reference to the airflow quantity (s) measured by the Gurley testing method based on the JIS P 8117 standard. A smaller airflow quantity means more excellent air permeability.

Meanwhile, the air permeability of the layer (B) comprising a thermoplastic resin can be measured in a state where it is not yet laminated on the reinforcing fiber bundle (A). Furthermore, in the case where the layer (B) comprising a thermoplastic resin is formed simultaneously with lamination, the layer (B) comprising a thermoplastic resin only can be produced under the same conditions as employed for the production of the prepreg, for being presented for measurement. Moreover, the layer (B) comprising a thermoplastic resin can be forcibly delaminated from the prepreg, for being presented for measurement. Even if it is forcibly delaminated, the measured value of air permeability is not greatly affected if it is not substantially damaged.

(2) Bonding State at Interface

With either the reinforcing fiber bundle (A) or the layer (B) comprising a thermoplastic resin held, a force capable of lifting the prepreg was applied to the prepreg in the direction likely to cause delamination at the interface, and the state at the interface was observed.

Entirely bonded: The state of bonding was kept substantially along the entire interface.
Partially bonded: The state of bonding was partially kept along the interface.
Not bonded: The state of bonding was not substantially kept along the interface.
Delaminated: The delamination between the reinforcing fiber bundle and the thermoplastic resin occurred.

(3) Content

A section of the prepreg was observed using an SEM. The section of the prepreg was observed in the orientation direction of the reinforcing fiber bundle (A), and an outline was drawn along the outermost contour of the reinforcing fiber bundle, to define the reinforcing fiber bundle region. The depth of the thermoplastic resin existing in the reinforcing fiber bundle region was measured and divided by the thickness of the reinforcing fiber bundle region, for evaluation as the content (%).

[Property Evaluation Methods Concerning the Prepregs of this Invention]

(1) Drapability

Figure 1:
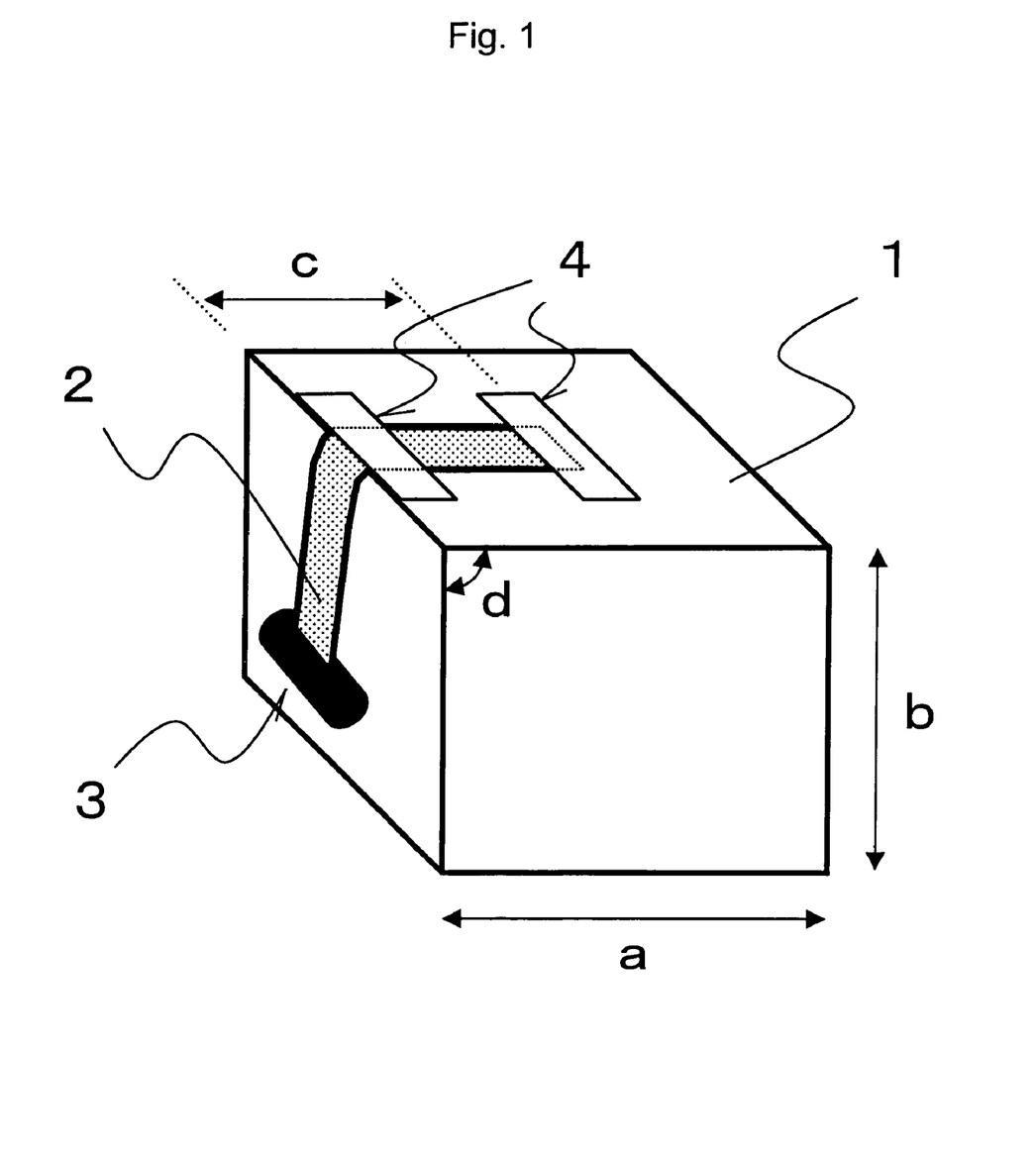
FIG. 1 is a perspective view of a jig for evaluating drapability.

The drapability in this invention expresses the degree at which the prepreg flexibly follows the mold without the fracture of the prepreg and without the breakage of the reinforcing fibers in the case where the prepreg is deformed along the mold. In this invention, an evaluation jig 1 shown in FIG. 1 was used for evaluation. The jig 1 had a length of a=100 mm, a height of b=100 mm and a block corner angle of d=90°. The obtained prepreg was cut to have a length of 100 mm and a width of 10 mm as a test sample 2. In this case, the length direction of the sample was made to agree with the longitudinal direction of the reinforcing fiber bundle. When plural reinforcing fiber bundles were laminated with the fiber bundles kept in plural directions, the length direction of the outermost layer was referred to. As illustrated, a 200 g weight 3 was attached to one end of the sample, and the other end and its intermediate point were fastened to the jig 1 using clamps 4 (the length of the fastened portion was 50 mm). With the weight 3 kept stationary, the prepreg 2 was observed. The drapability of each sample was evaluated according to the following 5-step criterion.

∘∘: Could be substantially kept in contact with the block faces forming an angle of 90°, without the fracture of the prepreg and the breakage of the reinforcing fibers. (Drapability was especially excellent.)

∘: Could be bent at the block corner having an angle of 90°, without the fracture of the prepreg and the breakage of the reinforcing fibers. When a larger force was applied, the prepreg could be forcibly kept in contact with the block faces without the fracture of the prepreg and the breakage of the reinforcing fibers. (Drapability was excellent.)

Δ: Could be bent at the block corner having an angle of 90°, without the fracture of the prepreg and the breakage of the reinforcing fibers. When a larger force was applied, it could not be forcibly kept in contact with the block faces or was fractured, or the reinforcing fibers were broken. (Drapability was not excellent.)

x: Could be bent at the block corner having an angle of 90° C. The prepreg was fractured, or the reinforcing fibers were broken. (Drapability was poor.)

xx: Could not be bent at the block corner having an angle of 90°. (Drapability was very poor.)

(2) Impregnability

The impregnability in this invention expresses the likelihood for the thermoplastic resin to permeate into the reinforcing fiber bundle when the heated and molten thermoplastic resin is molded. In this invention, the prepreg was molded under the following conditions, and the voids in the molded article were observed. That is, the obtained prepreg was cut to have a length of 100 mm and a width of 10 mm as a test sample according to the same procedure as used for the evaluation of drapability. For comparative evaluation, the samples must be equal in the volume percent of the reinforcing fibers.

Figure 2:
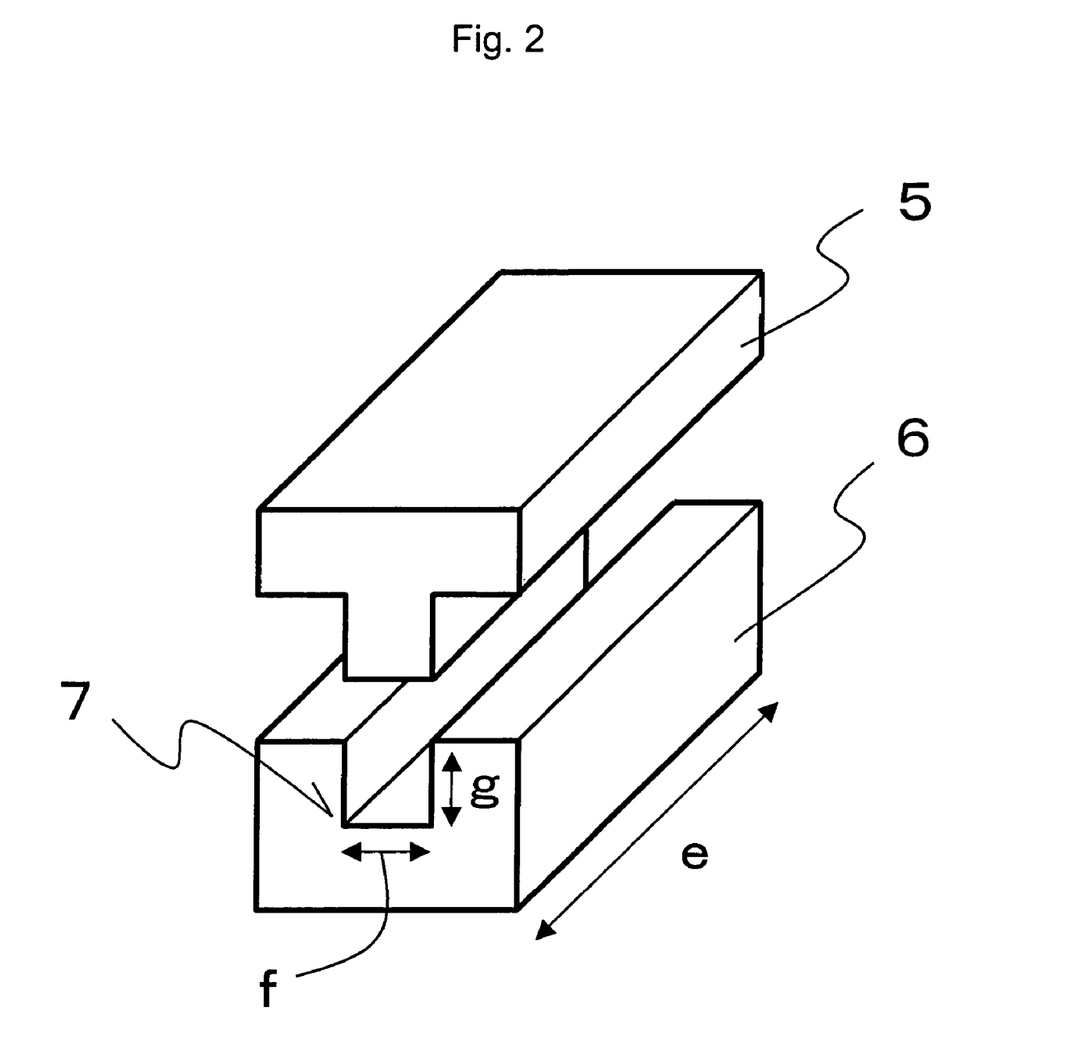
FIG. 2 is a perspective view of a mold for evaluating impregnability.

The test sample was molded using the evaluation mold shown in FIG. 2. The prepreg was set in the groove 7 (having a groove length of e=100 mm, a groove width of f=10 mm and a groove depth of g=10 mm) of a female mold member 6, and fixed by a male mold member 5, being press-molded using a press heated to a press temperature beforehand. The press temperature was set for the kind of the thermoplastic resin used. When PPS resin was used, 320° C. was used. The press pressure was 0 MPa during the period after insertion into the mold till 1 minute later, and 5 MPa till further 2 minutes later. After the pressure was released, the mold was cooled in a water-cooled press.

A section of the obtained molded article was observed, and the impregnability of each sample was evaluated according to the following four-step criterion. For evaluation of the section, an optical microscope was used.

∘∘: Few voids could be confirmed. (Impregnability was especially excellent.)

∘: The area of voids to the cross sectional area of the molded article was 10% or less. (Impregnability was excellent.)

Δ: The area of voids to the cross sectional area of the molded article was more than 10%. (Impregnability was not excellent.)

x: The area of voids to the cross sectional area of the molded article was more than 50%. (Impregnability was poor.)

(3) Handling Convenience

The appearance quality of the obtained prepreg was observed. Mainly in reference to the shape stability of the prepreg and non-conformances such as the fluffing and zigzag disposition of reinforcing fibers, evaluation was made according to the following three-step criterion.

∘: Could be used without any problem. (Handling convenience was excellent.)

Δ: Could be used, but showed shape defects and non-conformances. (Handling convenience was not excellent.)

x: Inconvenient to use due to the influence of shape defects and non-conformances. (Handling convenience was poor.)

[Property Evaluation Methods for the Molded Articles of the Invention]

(1) Bending Test

Figure 3:
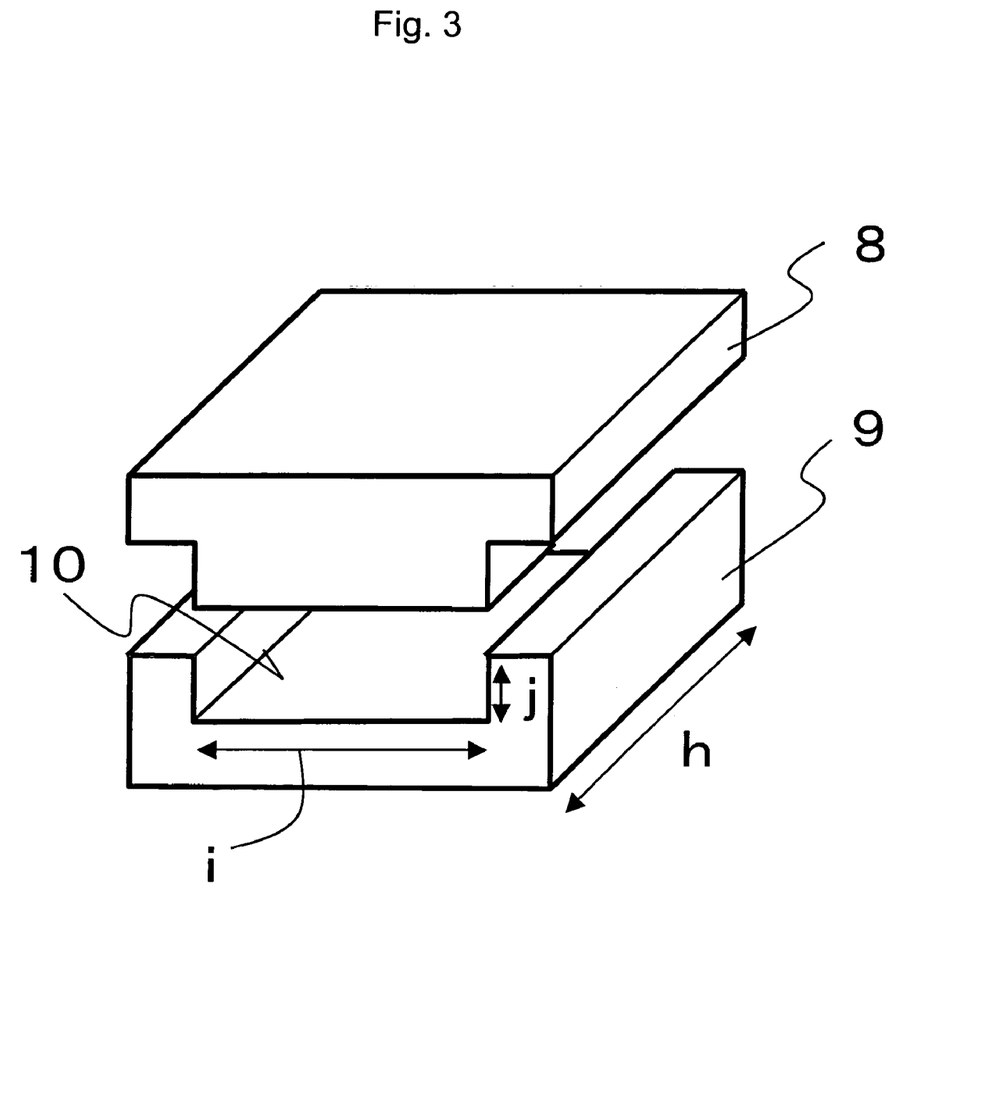
FIG. 3 is a perspective view of a mold for molding a bending test piece.

The obtained prepreg was cut to have a length of 200 mm and a width of 60 mm, and sheets of the prepreg were laminated in 0° direction on the groove 10 (having a groove length of h=100 mm, a groove width of i=60 mm, and a groove depth of j=10 mm) of a female mold member 9 of the evaluation mold shown in FIG. 3, to achieve a molded article thickness of 1 mm, and they were fixed by a male mold member 8, and press-molded, at a press temperature of 320° C. for a press time of 10 minutes at a press pressure of 5 MPa. After the pressure was released, a water-cooled press was used for cooling.

A test piece with a predetermined size was cut out of the molded article, and a bending test was performed based on the ASTM D 790 standard.

The respective components used in the examples of this invention and comparative examples were as follows. Continuous reinforcing fiber bundle Carbon fiber bundle: 12000 fibers, fineness 0.6 (g/9000 m)

Glass fiber bundle: RS110-QL-520 produced by Nitto Boseki Co., Ltd.

Thermoplastic Resin

Polyphenylene sulfide resin: Torelina (registered trademark) M2588 produced by Toray Industries, Inc.

EXAMPLE 1

Figure 4:
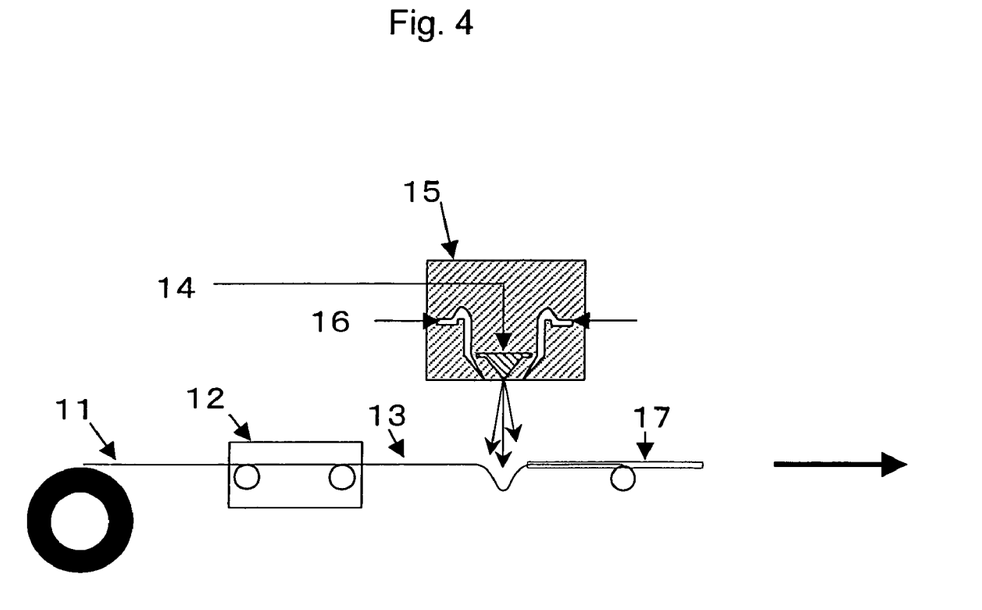
FIG. 4 is a typical view showing an example of the prepreg producing apparatus of this invention.

A prepreg was produced using the apparatus shown in FIG. 4. Plural continuous carbon fiber bundles 11 were paralleled in a width of 100 mm at strand intervals of 1 to 5 mm, and taken up at a speed of 10 m/min while being tensioned by a winder (not shown in the drawing). Upstream of the take-up line, a heating zone 12 of 200° C. was installed, to remove the binder deposited on the carbon fibers. In succession, a spreading zone 13 using air blow was installed, and while the air pressure was adjusted to keep the spreading ratio at 2.5, air was blown onto the top surfaces of the carbon fiber bundles.

Then, PPS resin 14 was melt-discharged from a melt blow die 15 (78 holes formed at a pitch of 1.2, each with a diameter of 0.35 mm) attached at the tip of a single-screw extruder with a screw diameter of 20 mm, and was blown onto the carbon fiber bundles of immediately after said spreading step, using heated air blow 16 with the air pressure adjusted to scatter the discharged resin. The discharged quantity of PPS resin was controlled such that the fiber volume content (Vf) of the prepreg became 60%.

The thermoplastic resin was solidified in a cooling zone, to obtain a prepreg 17 that was wound by a winder. In the prepreg, the PPS resin formed like a nonwoven fabric was laminated on the continuous carbon fibers. As a result of observation with an SEM and an optical microscope, the PPS fibers forming the nonwoven fabric were partially fusion-bonded to each other in random orientation, and some of them were mixed in the reinforcing fiber bundles. The obtained prepreg was presented for evaluation of its properties and for evaluation of the properties of the molded article.

Meanwhile, a fiber aggregate having the PPS resin air-blown under the same conditions as in producing the prepreg was collected on a mesh conveyor, and presented for measurement of air permeability.

EXAMPLE 2

A prepreg was produced by the same method as in Example 1, except that the take-up speed of the continuous carbon fiber bundles was changed to 20 m/min. Since the discharged quantity of PPS resin was increased in proportion to the take-up speed, the scattering of the discharged resin by air blow was lessened.

Meanwhile, as in Example 1, a fiber aggregate was collected on a mesh conveyor, and presented for measurement of air permeability.

EXAMPLE 3

A yarn-like prepreg with a width of 10 mm was produced according to the same procedure as in Example 1, except that one continuous carbon fiber bundle was used and that no heating zone was installed upstream of the carbon fiber bundle take-up line, and it was presented for various evaluations. The discharged quantity of PPS resin and the air pressure were adjusted to keep Vf at 60%.

EXAMPLE 4

A yarn-like prepreg was produced according to the same procedure as in Example 3, except that no spreading zone was installed on the carbon fiber bundle take-up line, and it was presented for various evaluations.

EXAMPLE 5

A yarn-like prepreg was produced under the same conditions as in Example 4, except that the pressure of the air blown to the PPS resin of Example 4 was set at 1.5 times, and it was presented for various evaluations.

EXAMPLE 6

A prepreg was produced according to the same procedure as in Example 4, except that the discharged quantity of PPS resin was adjusted to keep Vf at 45%, and it was presented for various evaluations. Since the discharged quantity of PPS resin was increased, the scattering by air blow was small, and the carbon fibers were laminated with the fiber diameter remaining large.

EXAMPLE 7

A yarn-like prepreg was produced under the same conditions as in Example 4, except that two melt blow dies were installed for blowing PPS resin onto both the sides of the carbon fiber bundle and that the discharge quantity of PPS resin was adjusted to keep Vf at 60%, and it was presented for various evaluations.

EXAMPLE 8

A yarn-like prepreg was produced under the same conditions as in Example 4, except that a glass fiber bundle was used as the continuous reinforcing fiber bundle, and it was presented for various evaluations.

COMPARATIVE EXAMPLE 1

Plural continuous carbon fiber bundles were paralleled in a width of 100 mm at strand intervals of 1 mm or less, and taken up at a speed of 10 m/s while being tensioned by a winder.

Then, PPS resin was extruded from a film slit die (100 mm width) attached at the tip of a single-screw extruder with a screw diameter of 20 mm, and laminated onto said carbon fiber bundles. Furthermore, the laminate was fed through a heating zone, and hot rolls were used to pressure-bond the film and the carbon fibers, for producing a prepreg. The discharge quantity of PPS resin was controlled to keep the Vf in the prepreg at 60%.

The above-mentioned film was presented for measurement of air permeability.

COMPARATIVE EXAMPLE 2

One continuous carbon fiber bundle was taken up at a speed of 10 m/min while being tensioned by a winder. No heating zone was installed upstream of the take-up line.

PPS resin was melt-extruded from a film slit die (30 mm width) attached at the tip of a single-screw extruder with a screw diameter of 20 mm, while being laminated on the carbon fiber bundle on said take-up line, and the laminate was wound around a heated bar, to be stroked, for forced impregnation of the molten PPS resin, for producing a 10 mm wide yarn-like prepreg. It was presented for various evaluations.

COMPARATIVE EXAMPLE 3

As in Comparative Example 2, PPS resin was extruded from a film slit die (10 mm width) attached at the tip of a single-screw extruder with a screw diameter of 20 mm, and the obtained film was laminated on the carbon fiber bundle on the take-up line. Furthermore, the laminate was fed through a heating zone, and hot rolls were used to pressure-bond the film and the carbon fiber bundle, for producing a 10 mm wide yarn-like prepreg, which was presented for various evaluations.

COMPARATIVE EXAMPLE 4

PPS resin was formed into a multifilament (filament diameter 20 μm) beforehand in a separate process. A continuous carbon fiber bundle and the continuous PPS resin multi-filament were joined, and an air stream was applied for sufficient interminglement, to produce a 10 mm wide yarn-like prepreg of a comingled form, which was presented for various evaluations.

COMPARATIVE EXAMPLE 5

PPS resin was formed into a multifilament (filament diameter=20 μm) beforehand in a separate process, and the multifilament was cut using a guillotine cutter, to obtain short PPS fibers. Then, the short PPS fibers were placed on a sheet while being oriented at random, and while a binder was applied, they were pressurized using a roller, to obtain a short PPS fiber sheet. The short PPS fiber sheet was placed on a continuous carbon fiber bundle, and a water jet was used to forcibly intermingle the carbon fiber bundle and the short PPS fibers, for producing a prepreg of a discontinuous comingled form. The obtained prepreg was cut in the fiber direction, to have a width of 10 mm and a length of 200 mm, and it was presented for various evaluations.

Finally, the balance between the above-mentioned evaluation items and productivity and economy was generally evaluated according to the following five-step criterion: ⊚⊚⊚ ... especially excellent, ⊚⊚ ... more excellent, ⊚ ... excellent, Δ ... not excellent, x ... poor.

The evaluation results are listed in Tables 1 to 3.

TABLE 1

|  |  |  | Example | | Comparative example |
|---|---|---|---|---|---|
|  |  |  | 1 | 2 | 1 |
| Reinforcing fiber bundle | Kind | — | Carbon fibers | Carbon fibers | Carbon fibers |
|  | Vf | % | 60 | 60 | 60 |
|  | Thickness | μm | 500 | 500 | 500 |
| Thermoplastic resin | Form | — | Nonwoven fabric-like | Nonwoven fabric-like | Film-like |
|  | Average fiber diameter | μm | 5 | 9 | — |
|  | Relation between fibers | — | Mutually fusion-bonded | Mutually fusion-bonded | — |
|  | Thickness | μm | 80 | 120 | 80 |
|  | Air permeability (Frazier) | cm$^3$/cm$^2$·s | 800 | 320 | — |
|  | Air permeability (Gurley) | sec | 50 | 50 | 10000 |
| Prepreg | Composite production method |  |  |  |  |
|  | State of thermoplastic resin | — | Heated and molten | Heated and molten | Formed as film |
|  | Composite production process | — | Air blow | Air blow | Thermal pressure bonding |
|  | Spreading ratio | — | 2.5 | 1.8 | — |
|  | Composite forming direction | — | Lamination on one side | Lamination on one side | Lamination on one side |
|  | Average layer thickness ratio | — | 6.3 | 4.2 | 6.3 |
|  | Bonding state at interface | — | Partially bonded | Partially bonded | Entirely bonded |
|  | Content | % | 6 | 2 | 0 |
| Properties of prepreg | Drapability | — | ⊚⊚ | ⊚ | X |
|  | Impregnability | — | ⊚⊚ | ⊚ | Δ |
|  | Handling convenience | — | ⊚ | ⊚ | ⊚ |
| Properties of molded article | Bending modulus of electricity | GPa | 118 | 118 | 95 |
|  | Bending strength | MPa | 2100 | 2030 | 1400 |
| General evaluation |  | — | ⊚⊚⊚ | ⊚⊚ | X |

TABLE 2

|  |  |  | Example | | | | |
|---|---|---|---|---|---|---|---|
|  |  |  | 3 | 4 | 5 | 6 | 7 |
| Reinforcing fiber bundle | Kind | — | Carbon fibers | Carbon fibers | Carbon fibers | Carbon fibers | Carbon fibers |
|  | Vf | % | 60 | 60 | 60 | 45 | 60 |
|  | Thickness | μm | 700 | 1000 | 1000 | 800 | 1000 |
| Thermoplastic resin | Form | — | Nonwoven fabric-like | Nonwoven fabric-like | Nonwoven fabric-like | Nonwoven fabric-like | Nonwoven fabric-like |
|  | Average fiber diameter | μm | 5 | 10 | 5 | 15 | 9 |
|  | Relation between fibers | — | Mutually fusion-bonded | Mutually fusion-bonded | Mutually fusion-bonded | Mutually fusion-bonded | Mutually fusion-bonded |

TABLE 2-continued

| | | | Example | | | | |
|---|---|---|---|---|---|---|---|
| | | | 3 | 4 | 5 | 6 | 7 |
| Prepreg | Thickness | μm | 35 | 140 | 40 | 1000 | 35* |
| | Air permeability (Gurley) | sec | — | 50 | — | — | — |
| | Composite production method | | | | | | |
| | State of thermoplastic resin | — | Heated and molten | Heated and molten | Heated and molten | Heated and molten | Heated and molten |
| | Composite production process | — | Air blow | Air blow | Air blow | Air blow | Air blow |
| | Spreading ratio | — | 2.5 | 1.2 | 2.8 | 1.2 | 1.4 |
| | Composite form | — | Lamination on one side | Lamination on one side | Lamination on one side | Lamination on one side | Lamination on both sides |
| | Average layer thickness ratio | — | 20 | 7 | 25 | 0.8 | 29 |
| | Bonding state at interface | — | Partially bonded | Partially bonded | Partially bonded | Partially bonded | Partially bonded |
| Properties of prepreg | Drapability | — | ○○ | ○ | ○ | ○ | ○ |
| | Impregnability | — | ○ | ○ | ○○ | ○ | ○○ |
| | Handling convenience | — | ○ | ○ | ○ | ○ | ○ |
| General evaluation | | — | ○○ | ○ | ○○ | ○○ | ○○ |

*Thickness of one side portion only

TABLE 3

| | | | Example | Comparative example | | | |
|---|---|---|---|---|---|---|---|
| | | | 8 | 2 | 3 | 4 | 5 |
| Reinforcing fiber bundle | Kind | — | Glass fibers | Carbon fibers | Carbon fibers | Carbon fibers | Carbon fibers |
| | Vf | % | 60 | 60 | 60 | 60 | 60 |
| | Thickness | μm | 1200 | 1000 | 1000 | — | 1000 |
| Thermoplastic resin | Form | — | Nonwoven fabric-like | — | Film-like | Fibrous | Mat-like |
| | Average fiber diameter | μm | 10 | — | — | 20 | 20 |
| | Relation between fibers | — | Mutually fusion-bonded | — | — | Non-fusion-bonded | — |
| | Thickness | μm | 170 | 80 | 80 | — | — |
| | Air permeability (Gurley) | sec | — | — | 10000 | — | — |
| Prepreg | Composite production method | | | | | | |
| | State of thermoplastic resin | — | Heated and molten | Heated and molten | Heated and molten | Continuous fibers | Short fibers |
| | Composite production process | — | Air blow | Forced impregnation | Thermal pressure bonding | Air intermingling | Water jet |
| | Spreading ratio | — | 1.2 | 1.0 | 1.0 | — | — |
| | Composite form | — | Lamination on one side | Lamination on one side | Lamination on one side | Comingling | Forced interminglement |
| | Average layer thickness ratio | — | 7 | 13 | 13 | — | — |
| | Bonding state at interface | — | Partially bonded | Entirely bonded | Entirely bonded | Not bonded | Delaminated |
| Properties of prepreg | Drapability | — | ○ | X | Δ | ○ | ○ |
| | Impregnability | — | ○ | ○ | X | ○ | Δ |
| | Handling convenience | — | ○ | X | ○ | Δ | Δ |
| General evaluation | | — | ○ | X | Δ | Δ | Δ |

As can be seen from the table, the prepregs of the examples are better in drapability, impregnability and handling convenience than the prepregs of the comparative examples. Furthermore, the prepregs of the examples assure high productivity, since the formation of the layer comprising a thermoplastic resin and the lamination of it on a reinforcing fiber bundle can be performed in one step.

From the comparison between Examples 1 and 2 and Comparative Example 1, it can be seen that molded products obtained from the prepregs of the examples are better in mechanical properties than the molded product obtained from the prepreg of the comparative example. The prepreg of Example 1 is especially excellent in properties, and the prepreg of Example 2 is especially excellent in productivity.

Industrial Applicability

The prepreg of this invention assures all of the drapability to allow easy shaping according to a mold, handling convenience, and the resin impregnation during molding. Furthermore, said prepreg can be provided stably at high productivity.

Furthermore, if the prepreg of this invention is used, a molded article with excellent mechanical properties can be provided. The molded article of this invention is useful for electric or electronic apparatuses, household or office products, game or amusement products, parts relating to optical apparatuses and precision machines, and various applications relating to motor vehicles, airplanes, sports, artificial satellites, etc. Above all, it can be suitably used for the housings of electric or electronic apparatuses, and the members and outside plates or skins of motor vehicles or airplanes.

The invention claimed is:

1. A process for producing a prepreg, comprising air-blowing a heated and molten thermoplastic resin onto a continuous reinforcing fiber bundle (A), in which the reinforcing fibers are aligned in one direction, to laminate the continuous reinforcing fiber bundle (A) with an air-permeable layer (B) comprising the thermoplastic resin;

wherein said reinforcing fibers are selected from the group consisting of glass fibers, carbon fibers, metal fibers, aromatic polyamide fibers, polyaramide fibers, alumina fibers, silicon carbide fibers, boron fibers and combinations thereof; and further wherein, when the continuous reinforcing fiber bundle (A) and the thermoplastic resin (B) are laminated, spreading the reinforcing fiber bundle A before laminating to the layer (B) comprising the thermoplastic resin, wherein a spreading ratio of the reinforcing fiber bundle (A) is 2.0 or more.

2. A process for producing a prepreg, according to claim 1, comprising blowing air to spread the continuous reinforcing fiber bundle (A) and to blow the thermoplastic resin simultaneously.

* * * * *